United States Patent

[11] 3,539,229

[72] Inventor Andrew J. Scully
 Warren, Michigan
[21] Appl. No. 797,739
[22] Filed Feb. 10, 1969
[45] Patented Nov. 10, 1970
[73] Assignee The United States of America
 as represented by the Secretary of the Army

[54] TRACK TENSION OVERLOAD DEVICE
 5 Claims, 5 Drawing Figs.
[52] U.S. Cl............................................................ 305/10,
 267/34
[51] Int. Cl.......................................................... B62d 55/30
[50] Field of Search............................................ 267/34;
 305/10

[56] References Cited
 UNITED STATES PATENTS
 2,333,096 11/1943 Dowty............................ 267/34
 2,561,901 7/1951 Bachman........................ 305/10

Primary Examiner—Richard J. Johnson
Attorney—Harry M. Saragovitz, Edward J. Kelly, Herbert Berl and Edward P. Barthel ABSTRACT: A track tension device having telescopic cylinders which contract automatically during overload conditions above a preset valve. The device resists working loads within a predetermined range by maintaining the cylinders at a constant length so that initial track tension may be set low enough to provide good efficiency. Under overload conditions the hydraulic pressure in a primary chamber exceeds the preset limit of a high pressure relief valve allowing efflux of fluid into a secondary chamber causing a resiliently biased piston to yield with the resultant telescoping of the cylinders. A low pressure check valve allows the working fluid to return to the primary chamber when the overload condition is removed.

Patented Nov. 10, 1970 3,539,229

ANDREW J. SCULLY
INVENTOR

BY H. M. Saragovitz
E. J. Kelly
H. Berl
and E. P. Barthel

ATTORNEYS

3,539,229

TRACK TENSION OVERLOAD DEVICE

BACKGROUND OF THE INVENTION

1. Field of the Invention

The present invention relates to a track tension device for use with a tracked vehicle such as a pneumatic tracked marginal terrain amphibious vehicle. It more particularly relates to a track tension device for the vehicle, selectively affording a single acting rigid track tension during normal modes of operation and a yieldable track tension when the track is subjected to excess working loads or overloads.

2. Description of the Prior Art

Amphibious vehicles of a type disclosed in U.S. Pat. No. 2,916,006 granted Dec. 8, 1959, to L. Crandall suitable for military use such as troop carriers are designed for use in swamp and extensive waterway areas as well as on dry land. Their suspension system consists of two individually driven tracks composed of low pressure, wide tread tires mounted on individual axles attached at both ends to drive chains. Pneumatic action of the tires provide the only spring response to rough terrain, since the vehicles sponsons (side extensions designed to increase its lateral stability) either rest or ride on top of the tires, with no mechanical connection in between. Large drive sprockets engage the track chains to propel the marginal terrain vehicle. When travelling on firm ground or terrains possessing varying degrees of softness the vehicle body rolls over the tires as though on a roller conveyor. When its operation is required in a marine environment, the carrier's wheels, serving as combination track grousers and paddles, propel the vehicle through soft earth, mud or water.

The aforementioned amphibious vehicles of this type hitherto have had the difficulty of achieving a suitable self-adjusting track tension device which functions during all phases of its operation. The tension and adjusting device presently employed comprises a grease filled cylinder which collapse upon overload and requires manual pumping to reset the hydraulic pressure within the track tension cylinder.

SUMMARY

In the track tensioning means of the present invention for use with tracked amphibious vehicles applicant has provided a hydraulic cylinder assembly for automatically adjusting the spacing between the sprocket and idler wheel so that the tension applied to the track is maintained substantially constant during normal vehicle operation. This is accomplished by having the hydraulic pressure in a primary chamber absorb a limited predetermined load allowing the cylinder assembly to maintain a substantially constant length to hold the track idler sprocket in a fixed position relative to the drive sprocket. Under overload conditions, the hydraulic pressure in the primary chamber exceeds the preset limit thereby allowing efflux of fluid from the primary chamber through a high pressure relief valve into a secondary chamber which in turn forces a piston back against suitable resilient biasing means causing the cylinder assembly to telescope. This results in the reduction of the normal spacing between the idler sprocket and drive sprocket by means of suitable pivotal connections. It will be noted that the high pressure relief valve functions to withstand overload pressure several times greater than the initial pressure of the primary chamber before opening. When the overload condition is removed, the resilient biasing means returns the piston forcing the working fluid from the secondary chamber through a return low pressure check valve to the primary chamber whereupon the assembly assumes it normal length to takeup the track chain slack and return the chain to its initial tension. By means of this arrangement the resilient biasing means is effective only during periods of overload and is rendered ineffective during normal vehicle operation.

It is therefore an object of the present invention to provide a track tension device for a tracked vehicle wherein the device provides initial track tension while having means to automatically absorb track tension overloads.

A further object of this invention is to provide a track tension device for an amphibious-type pneumatic tracked vehicle having both rolling and crawling modes of operation wherein the device absorbs normal tension loads while maintaining a constant length and is automatically operable to provide a reduced length during periods of track tension overload.

Still another object of the invention is to provide a hydraulic track tensioning device for an amphibious-typed tracked vehicle operable during normal loading to maintain a predetermined spacing between the idler and drive sprockets and is automatically operable to reduce the spacing by means of a high pressure relief valve and low-pressure check valve arrangement to render effective a resiliently biased piston for allowing displacement by the hydraulic working fluid.

DESCRIPTION OF THE PREFERRED EMBODIMENT

Figure 1:
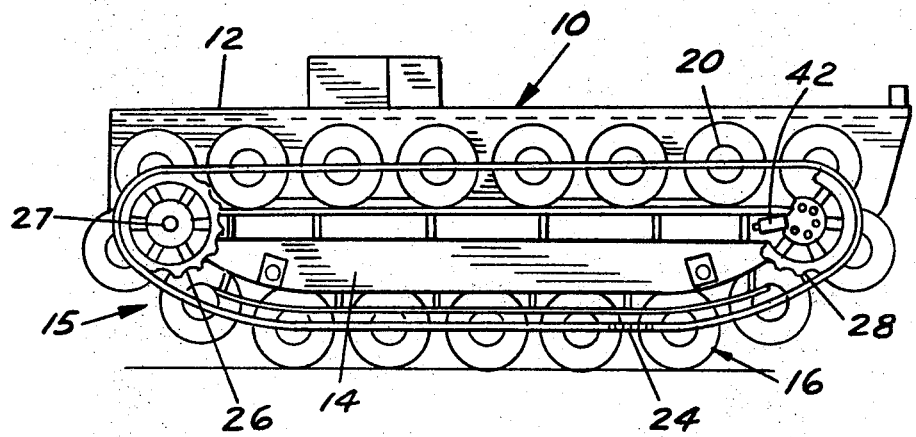
FIG. 1 is a side elevation of the vehicle and its associated track, for use with the present invention.

With reference to the drawing the vehicle shown in FIG. 1 is a marginal terrain vehicle, such as a troop carrier, and comprises a hull assembly 10, illustrated as having a central crew and cargo compartment 12, and having on either side a sponson 14. The hull is supported on two sets of track assemblies, the left hand one of which is illustrated in FIG. 1 and indicated at 15. As the track assemblies for each side of the vehicle are identical in construction and operation, a detailed description of one only is considered sufficient for the purposes of this disclosure and the assembly 15 has been selected for description.

The suspension system of the instant vehicle consists of two individually driven tracks composed of pneumatic tire assemblies 16, which in the instant embodiment comprise low pressure, low-profile wide tread tires 18 having a size approximately 24 inches in diameter and 21 inches wide, mounted on individual axles 20 attached at both ends by hubs 22 to drive chains 24. In the instant embodiment each track assembly consists of seventeen tires which rotate freely and independently of the chains and whose pneumatic action provides the only spring response to rough terrain since the vehicle sponsons 14 either rest or ride on top of the tires with no mechanical connection in between.

The tracks are engaged by a pair of front drive sprockets 26 and a pair of rear idler sprockets 28. The front drive sprockets 26, the inboard ones of which are unshown, are mounted on the drive axle 27 driven from a suitable power plant disposed within the vehicle hull and acting through suitable transmission and differential gearing, not illustrated.

The vehicle has two modes of operation depending upon soil conditions. Up to a certain sinkage the vehicle operates by rotating the drive sprockets 26 which lays a tire on the ground in front of the vehicle whereby the vehicle rolls over the tire in a manner similar to a block of wood rolling over a pencil on a table top. Beyond this sinkage, the increased resistance inhibits rolling and the tires act as large grousers on a track. When in the rolling mode the vehicle speed is twice the chains speed, whereas in the track vehicle mode of operation, the vehicle speed is equal to the chain speed.

In the preferred embodiment the hull of the amphibious vehicle is a combination welded and riveted aluminum structure fabricated from standard aluminum extrusions which form the floor, sides and sponson ribs; while sheet aluminum is used for the hull front, bulkheads and sponson sides. The vehicle shown in operated by a two-man crew and weighs about 11,500 pounds. It will thus be seen that due to the light weight construction of this type of vehicle, conventional prior art track tensioners would over stress the hull to the point of actual failure thereof.

As mentioned above, the track assemblies are part of the vehicle suspension system which together with the associated drive sprockets, idler sprockets and chain tensioning device complete the system. The pair of idler sprockets 28 are mounted on a stub axle assembly 30 by means of trunnion bearing members, the outboard one of which is shown at 32 in FIG. 2. The ends of the axle 30 are journaled in sleeves 34 and 36 respectively.

Figure 2:
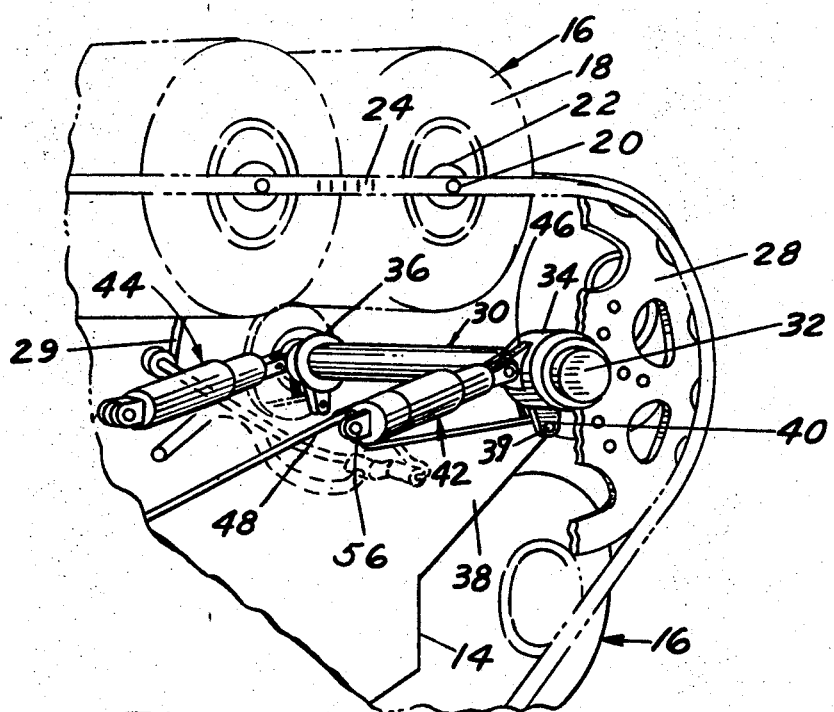
FIG. 2 is a fragmentary perspective view of the idler wheel portion of the vehicle of FIG. 1 with portions removed or deleted for purposes of clarity.

The axle 30 is mounted for pivotal movement by means of bracket arms formed as extensions of the sponson side panel portion of the vehicle frame and indicated in FIG. 2 by the outboard bracket arm 38. The sleeves 34 and 36 are pivotally secured by pin 39 and clevis member 40 on the sleeve 34. The inboard axle sleeve 36 is pivotally connected to the sponson 14 in a similar manner.

A pair of track tensioning devices generally indicated at 42 and 44 are shown mounted between the axle 30 and vehicle frame. As seen in FIG. 2 the outboard tensioning device 42 is pivotally connected at one end to the bracket ear 46 on sleeve 34 and pivotally connected at its opposite end to upstanding sponson bracket 48. The inboard tensioning device 44 is pivotally connected in a like manner between the sleeve 36 and the vehicle frame.

The pair of tensioning devices of the present invention operate to hold the axle assembly 30 rearwardly to maintain the proper tension on the track chains 24 for normal driving loads. By means of the above described arrangement the axle assembly 30 together with the pair of idlers 28 are free to pivot forwardly when the track assembly is subjected to overload conditions caused, for example, by a rock or other foreign object being caught between the chain and idler or sprocket which could cause failure of the tracks or even warping of a light-weight constructed vehicle body.

Figure 3:
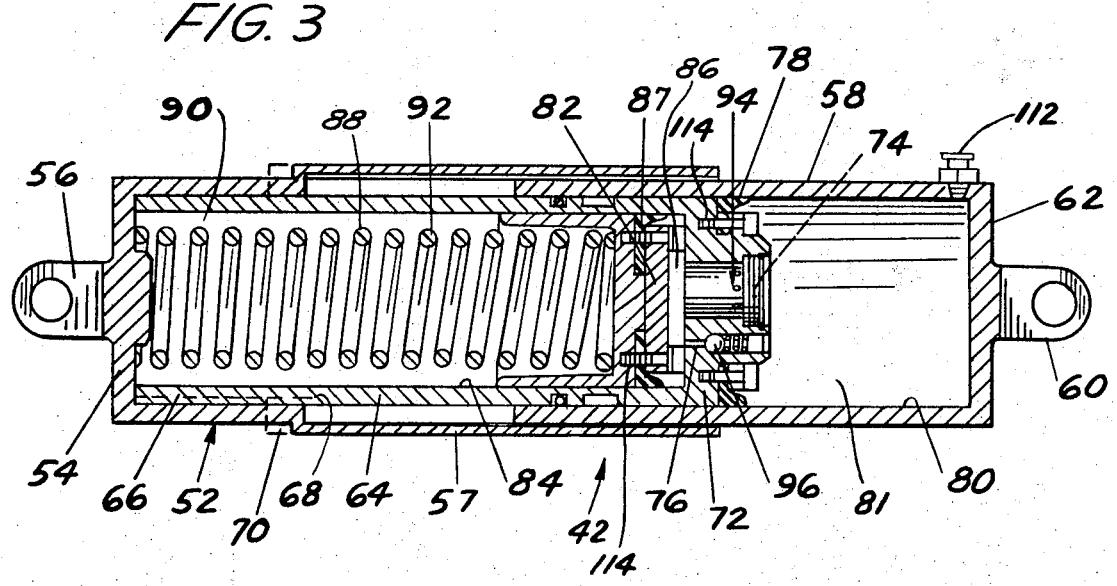
FIG. 3 is an enlarged longitudinal vertical section of one of the track tensioning devices of FIG. 2, the operative parts being shown in their extended position.
Figure 4:
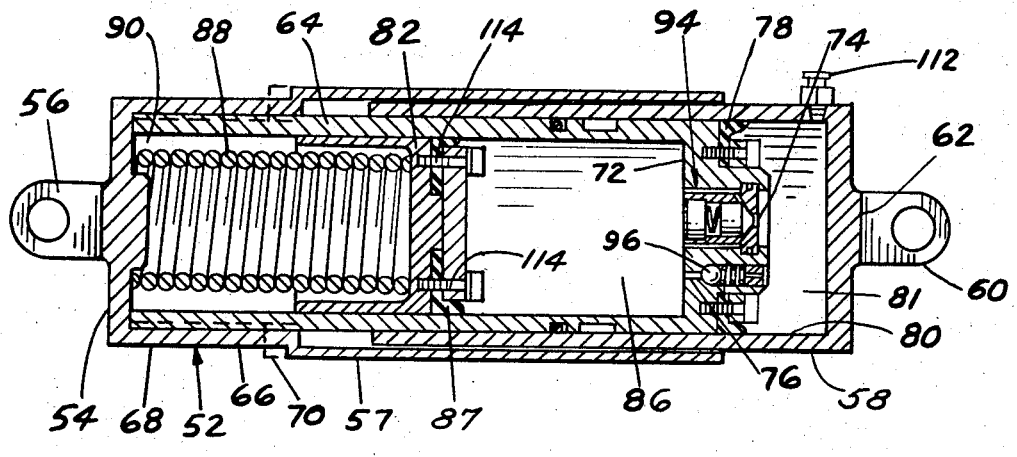
FIG. 4 is a view similar to FIG. 3 showing the device as it approaches the limit of its collapsed stroke.

As both tension units 42 and 44 are identical, only the outboard unit 42 will be described in detail. As seen in FIGS. 3 and 4 the device 42 consists of a cylindrical casing assembly generally indicated at 52 having a closed end cap 54, which includes a mounting clevis 56 that serves to pivotally connect an end of the unit 42 to the vehicle sponson bracket 48. The barrel portion 57 of the casing assembly 52 has an enlarged internal diameter to enable reception of a closed end outer cylinder 58 which is reciprocably supported therein. A mounting clevis 60 fixedly secured to the head portion 62 of the outer cylinder pivotally connects by means of a suitable pin, the opposite end of the unit 42 to the bracket ear 46.

The casing assembly 52 is provided with an inner hollow cylinder 64 which has its open end threadably engaged at 66 with the internal portion of the end cap 54 and the reduced portion of the barrel portion 57. It will thus be seen that the casing assembly 52 is made in two sections such that the barrel segment 57 and the cap 54 of casing 52 are both retained by the treaded region 66 of inner cylinder 64 in jamnut fashion. The barrel 57 is also formed with a hexagonal wrench gripping portion 70 to facilitate disassembly.

The head portion 72 of the inner cylinder 64 is provided with two fluid flow passages 74 and 76, the flow of fluid through these passages acting in opposite directions. The head portion 72 includes a lip-type molded cup packing 78 which circumferentially engages the inner wall 80 of the outer cylinder 58. Thus, the head portion of 62 of the outer cylinder 58 and the head portion 72 of the inner cylinder 64 cooperate to form a closed primary chamber 81 which in this case is pressurized with an incompressible hydraulic fluid such as oil.

Similarly, a piston head 82 is slidably received within inner cylinder 64 and has suitable means such as cup packing 87 which sealingly engages the cylinder inner wall 84. The piston head 82 together with the inner wall 84 define a secondary chamber 86. A coil spring 88 is disposed within the inner cylinder spring chamber 90 and has one end bearing upon the adjacent face of the cap 54 and the other end received within the piston head 82.

Figure 5:
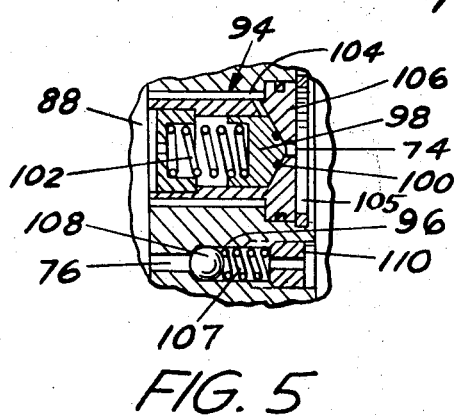
FIG. 5 is an enlarged fragmentary view of the valve portions of the device of FIGS. 3 and 4.

The head portion 72 of the inner cylinder 64 has relief valve means 94 of the poppet type controlling passage 74. As best seen in enlarged FIG. 5 the pressure relief valve 94 has a spring-loaded guided poppet 98 which seals the passage 74 with the aid of O-ring 100. The valve 94 is held closed by a spring 102 so that the valve must be subjected to a predetermined pressure by the working fluid in chamber 81 to open. In the instant embodiment the valve 94 is designed to open at about 1,000 p.s.i. of over-pressure in chamber 81. A plurality of valve ports for the relief valve 94 are located concentrically at 104 for communication with the secondary chamber 86. Suitable means such as snap-ring 105 are used to retain the relief valve plug 106 in a counterbored recess.

The check valve 96 is held closed by the spring 107 which retains the ball 108 in closing sealing engagement of passage 76 and has an inline valve port structure 110, threadably retained in head portion 72.

When the track tensioning device of the invention is at rest, the pressure of the working fluid is substantially the same in primary chamber 81 and secondary chamber 86. This pressure is preset by a hydraulic pump (not shown), either motor driven or manual which introduces hydraulic fluid, for example oil, under pressure into primary chamber 81 by means of the fluid connection 112 which communicates with the chamber 81 and in turn is connected to a source of hydraulic fluid. Once the proper fluid pressure, which in the instant case is approximately 50 p.s.i., is attained in chamber 81 so that the track chains are properly tensioned, the connection is sealed. It will be noted that under these passive conditions the heads of the stop bolts, indicated at 114, engage the head portion 72 so that the spring 88 is ineffective in the hydraulic fluid system of the device.

Under normal driving loads, the pressure in primary chamber 81 fluctuates according to the external load applied to the tensioning device. However, as long as the pressure remains below a preselected valve, such as 1,000 p.s.i. in the instant case, the tensioning device maintains a constant length (FIG. 3) and contraction of the spring 88 will not take place since the pressure relief valve will remain closed to prevent fluid drain from chamber 81.

Under overload conditions, the poppet 98 of the relief valve will be displaced leftwardly by the hydraulic pressure in the chamber 81 thereby allowing hydraulic fluid flow from chamber 81 through the valve ports 104 to the secondary hydraulic chamber 86. As the overload causes the cylinder 58 to telescope to the left the pressure of the hydraulic fluid in secondary chamber 86 urges the piston head 82 to be displaced leftwardly with respect to cylinder 64 thus compressing the spring 88 and allowing the device to contract through a maximum distance represented in FIG. 4. In this way the volume of primary chamber 80 diminishes while that of the secondary chamber 86 increases.

When the overload is reduced the chains 24 of the tracks become slack, the spring 88 has sufficient compressive force to move the piston head 82 to the right, as viewed in FIG. 4, causing the hydraulic fluid in secondary chamber 86 to open flow-check valve 96 and flow therethrough back into the primary chamber 81. This results in the tensioning device expanding to the position of FIG. 3 to provide initial track chain tension. It will be seen that during the movement of the piston head 82 to the right the passages 104 which allow the flow of hydraulic fluid from the primary chamber 81 to the secondary chamber 86, is sealing blocked by the poppet 98.

In this manner Applicant's system allows the tensioning device to passively resist working loads far in excess of and independent of initial track chain tension. The result is that the initial tension can be designed at a low level to provide good track chain efficiency during normal drive conditions while automatically handling overloads occurring either during the crawling mode of vehicle travel or caused by foreign objects being caught in the chain drive system.

It should be mentioned that Applicant also contemplates that the chamber 90 occupied by spring 88 could be a pneumatic chamber connected to a source of pneumatic fluid, preferably air under pressure through a check valve (not shown), to allow the spring chamber 90 to be pressurized for greater initial tension of the device.

I claim:

1. A track tension device for marginal terrain vehicles and the like having two relatively movable parts which are to be maintained with a predetermined normal spacing and whose relative movement is to occur during periods of track overload, said track tension device comprising:

an outer cylinder member having one end closed, said outer cylinder closed end connected with one of said parts;

a casing member having one end closed, said casing closed end connected with the other of said parts and telescopingly receiving said outer cylinder member;

an inner cylinder member having one end closed fixably positioned within said casing member and telescopically received within said outer cylinder member thereby forming a primary fluid chamber between the closed ends of said inner and outer cylinder members;

a piston member reciprocable in said inner cylinder and forming a secondary fluid chamber with the closed end of said inner cylinder member;

resilient means reacting against said piston member to maintain the latter in contact with said inner cylinder closed end until the creation of a predetermined overload fluid pressure in said primary chamber;

first valve means positioned in said inner cylinder closed end for permitting the flow of fluid from said primary chamber to said secondary chamber upon the creation of the predetermined overload pressure in said primary chamber;

said resiliently biased piston adapted to allow said track tension device to contract under the influence of the overload to reduce the normal spacing of said parts, and second valve means responsive to a predetermined pressure in said secondary chamber upon release of the overload for opening communication therethrough in response to motion of said piston to reestablish the predetermined normal spacing of said parts.

2. A track tension device as defined in claim 1 wherein said resilient means includes an energy absorbing helical compression spring mounted in said inner cylinder.

3. A track tension device as defined in claim 2 wherein said piston member has a hollow piston head for receiving one end of said helical compression spring.

4. A track tension device as defined in claim 1 wherein said first valve means is a high pressure cone type relief valve.

5. A track tension device as defined in claim 1 wherein said second valve means is a ball type check valve.